United States Patent
Henneken et al.

(10) Patent No.: US 7,069,132 B2
(45) Date of Patent: Jun. 27, 2006

(54) METHOD FOR MODIFYING A DEFINED ADAPTIVE DRIVING STRATEGY

(75) Inventors: Markus Henneken, Kressbronn (DE); Friedemann Jauch, Meckenbeuren (DE); Kai-Uwe Herbster, Friedrichshafen (DE); Franz-Josef Schuler, Kressbronn (DE); Thomas Mauz, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 330 days.

(21) Appl. No.: 10/275,610

(22) PCT Filed: May 4, 2001

(86) PCT No.: PCT/EP01/05076

§ 371 (c)(1),
(2), (4) Date: Nov. 7, 2002

(87) PCT Pub. No.: WO01/86175

PCT Pub. Date: Nov. 15, 2001

(65) Prior Publication Data
US 2003/0139869 A1   Jul. 24, 2003

(30) Foreign Application Priority Data
May 9, 2000   (DE) ............................... 100 22 610

(51) Int. Cl.
*G06F 7/00*   (2006.01)
*G06F 17/00*   (2006.01)
(52) U.S. Cl. .................... 701/58; 701/51; 701/56; 477/110
(58) Field of Classification Search .............. 701/51, 701/58, 55, 56, 110; 477/110, 98, 45, 46, 477/48, 121, 143; 706/23; 702/92, 93, 94
See application file for complete search history.

(56) References Cited

U.S. PATENT DOCUMENTS

| | | | | |
|---|---|---|---|---|
| 4,208,929 A | * | 6/1980 | Heino et al. | 475/65 |
| 5,034,889 A | * | 7/1991 | Abe | 701/35 |
| 5,084,821 A | * | 1/1992 | Ohsuga et al. | 701/48 |
| 5,089,963 A | * | 2/1992 | Takahashi | 706/23 |
| 5,157,609 A | | 10/1992 | Stehle et al. | 364/424.1 |
| 5,467,277 A | | 11/1995 | Fujisawa et al. | 364/424.05 |
| 5,491,635 A | * | 2/1996 | Foeldi et al. | 701/113 |
| 6,037,731 A | * | 3/2000 | Fruehauf et al. | 318/468 |
| 6,038,505 A | * | 3/2000 | Probst et al. | 701/65 |
| 6,086,506 A | * | 7/2000 | Petersmann et al. | 477/45 |
| 6,102,002 A | * | 8/2000 | Gimmler et al. | 123/399 |
| 6,173,227 B1 | * | 1/2001 | Speicher et al. | 701/51 |
| 6,216,077 B1 | * | 4/2001 | Loffler et al. | 701/58 |
| 6,253,139 B1 | * | 6/2001 | Borodani et al. | 701/55 |

(Continued)

FOREIGN PATENT DOCUMENTS

DE   39 22 051 A1   1/1991

(Continued)

*Primary Examiner*—Gertrude A. Jeanglaude
(74) *Attorney, Agent, or Firm*—Davis & Bujold, P.L.L.C.

(57) ABSTRACT

A method for modifying a defined adaptive driving strategy, which is stored in the control system for an automatic transmission of a motor vehicle, for adaptation to another type of driver with a different driving style, consists in that the parameters used for the driving strategy are modified by the other driver, the data for this being input to the transmission electronics via an input unit and an interface with the electronics.

24 Claims, 1 Drawing Sheet

U.S. PATENT DOCUMENTS

| | | | |
|---|---|---|---|
| 6,311,114 B1 | 10/2001 | Graf et al. | 701/57 |
| 6,317,666 B1 * | 11/2001 | List et al. | 701/29 |
| 6,449,572 B1 * | 9/2002 | Kurz et al. | 702/94 |
| 6,450,919 B1 * | 9/2002 | Kusafuka et al. | 477/115 |
| 6,571,162 B1 * | 5/2003 | Kusafuka et al. | 701/51 |
| 6,766,238 B1 * | 7/2004 | Graf et al. | 701/54 |

FOREIGN PATENT DOCUMENTS

| | | |
|---|---|---|
| DE | 43 37 164 A1 | 5/1994 |
| DE | 40 33 574 C2 | 3/1997 |
| DE | 197 52 623 A1 | 6/1999 |
| EP | 0 638 742 A1 | 2/1995 |
| EP | 0 950 839 A2 | 10/1999 |

* cited by examiner

METHOD FOR MODIFYING A DEFINED ADAPTIVE DRIVING STRATEGY

FIELD OF THE INVENTION

The present invention concerns a method for modifying a defined adaptive driving strategy, which is stored in the control system for an automatic transmission of a motor vehicle as a function of a plurality of parameters that characterize a particular type of driver and his driving style and of a plurality of parameters that characterize the motor vehicle and the way it drives.

BACKGROUND OF THE INVENTION

Modern automatic transmissions for motor vehicles adapt themselves to the driving style of the driver by an adaptive driving strategy. This links the driver type evaluation with the adapted selection of gear and converter coupling shift characteristics with additional functions, for example recognition of the driving resistance, urban driving, a spontaneous deceleration and a spontaneous acceleration of the vehicle and the condition of the road with the low-friction value, hot running and high-temperature operation. This makes it possible to use economical, i.e., consumption-saving gear-shift characteristics when a 'quiet' driver is recognized. Further, a 'sporty' driver and driver types between these can be recognized. However, the allocation of a driver type recognized by the adaptive driving strategy to another driver can no longer be modified. Nor can the time dependence when changing from one driver type to another driver type be modified.

Known driving strategies offer the recognized driver type a defined driving strategy which is stored in the control system for the automatic transmission; for example, with a sporty driver gear-shift characteristics at higher engine speeds are used.

For example, DE 39 22 051 describes a control device for an automatic transmission, which is intended to improve adaptation to the driving behaviour of the driver or his vehicle handling that depends on the traffic situation. For this purpose the internal combustion engine can be influenced by a power control element, for example an accelerator pedal or a throttle valve, in that transmission gear ratios are selected automatically via gear-shift programs which depend on the position of the power control element and the engine speed, and a signal proportional to the position of the power control element is detected cyclically or anticyclically. From the signal value detected a driving activity is determined and used for the selection of a gear-shift program. Besides the signal value detected for the power control element a further signal value pertaining to an operating or driving parameter of the motor vehicle, for example the driving speed, the transverse acceleration, the longitudinal acceleration and/or the longitudinal deceleration and the engine speed is determined cyclically or anticyclically, after which the signal values detected are converted via performance graphs influenced by operating or driving parameters of the motor vehicle into values of primary characteristics from which, via a switching function, a value of a secondary characteristic is obtained and a value of a first driving activity is determined as a weighted sum on the one hand from the secondary characteristic actually obtained and on the other hand from the value of a first driving activity determined a certain calculation time earlier and stored, or a number of secondary characteristic values obtained earlier and stored, this being used for the selection of a gear-shift program.

Thus, starting from a consumption-optimized gear-shift program, the control system for the automatic transmission adapts itself dynamically to the driving behaviour and the driving and traffic situations actually prevailing, without the need to actuate additional operating elements. However, no provision is made in this for the driver to manipulate the adaptive driving strategy comprehensively.

The purpose of the present invention is to provide a method whereby it is made possible for a driver other than the driver responsible for the defined adaptive driving strategy that has been stored, to match the gear-shift strategy more closely to his own needs.

SUMMARY OF THE INVENTION

The invention provides that to adapt to another driver type with a different style of driving, the parameters used for the driver type evaluation are modified by the driver, the data required for this being input via an input unit and an interface with the transmission electronics into the said electronics.

BRIEF DESCRIPTION OF THE DRAWING

The invention will now be described, by way of example, with reference to the accompanying drawings in which.

DETAILED DESCRIPTION OF THE INVENTION

Figure 1:
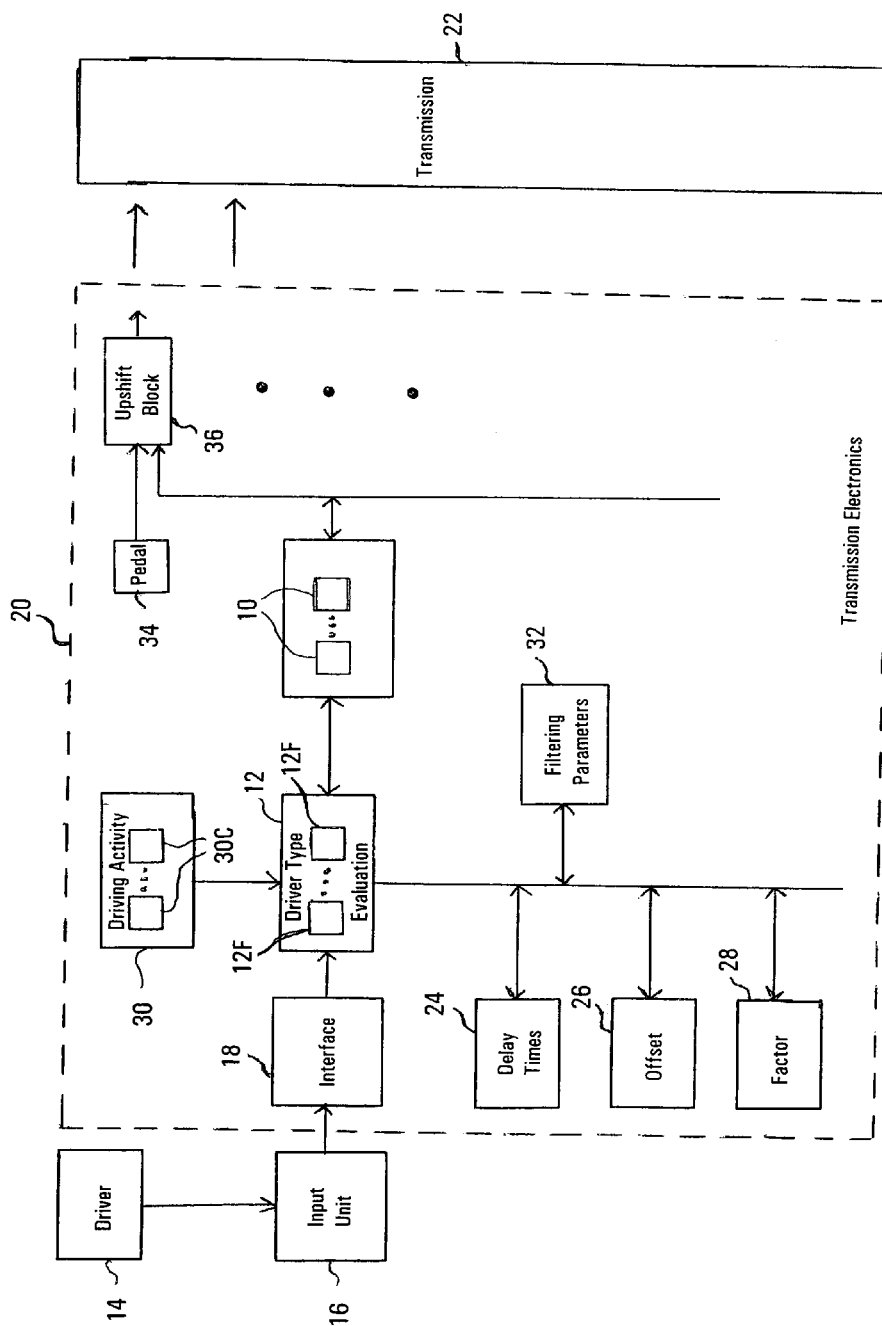
FIG. 1 is a block diagram of a driving strategy system of the present invention.

According to the invention it is provided that by means of a given input unit 16, for example the radio keys, the driver 14 can modify selected parameters 10 of the adaptive driving strategy for the driver type evaluation 12. This makes it possible to alter the time-dependence when changing from one driver type to another driver type. In addition, the driver 14 can modify the transmission 22 shift behavior related to a given type of driver 14, for example, by means of delay times 24, offsets 26 and factors 28. This results in greater customer satisfaction, even though only a limited number of parameters 10 can be changed in order to be sure of avoiding dangerous situations.

To modify the adaptive driving strategy, certain parameters 10 must be made available. The driver type evaluation 12 is of central importance for the adaptive driving strategy. It contains various evaluation functions 12F, such as evaluation of the longitudinal acceleration, the transverse acceleration, the starting behavior and the kick-down behavior. The parameters 10 for driver type evaluation 12 can be modified, in particular, by acting upon the driving activity 30 (i.e., the evaluation counters 30C) or the contributions of the individual evaluation functions 12F by means of an offset 26 or a factor 28. This changes the allocation of driving activity 30 to a defined and stored driver type. Another possibility is to modify the filtering parameters 32 for the upper and lower specifications of driver activity or the contributions of the individual evaluation functions 12F. This modifies the dynamic behaviour of the driver type evaluation 12.

The recognition of a curve can also take place earlier or later in accordance with a factor 28 or offset 26. According to the curve, the factor 28 enables the curve to be recognized earlier or later.

When the accelerator pedal 34 is released, this can be used to activate an upshift block 36. This activation can be modified by virtue of an adjustable parameter 10. The removal of this upshift can be modified, as necessary, by the factor 28.

Similarly, if the accelerator pedal 34 is depressed rapidly the driving activity 30 can be spontaneously increased by increasing the evaluation counter 30C, as a result of which a downshift is activated, if necessary. This activation can be modified by an adjustable parameter 10.

The resetting of the driving activity 30 is controlled for example by a delay time 24. The factor 28 can be applied as an adjustable parameter 10 to modify the delay time 24.

If the vehicle decelerates spontaneously due to rapid braking, forced downshifts and upshift blocks 36 can be activated. This activation can take place as a function of an adjustable parameter 10. Likewise, the upshift block 36 can be deactivated by an adjustable factor 28 at the driver's 14 wish.

These parameters 10 are modified by the driver 14. For that purpose an interface 18 with the transmission electronics 20 must be provided, which is connected to an input unit 16 by means of which the signals for parameter 10 modification are input to the transmission electronics 20. The input unit 16 can for example be the radio. The driver 14 enters a certain code number via the radio keys and thereby modifies the selected parameters 10 of the adaptive driving strategy.

The parameters 10 can also be modified via re-writable CD-ROMs, diskettes, a laptop which can, for example, communicate with the navigation system, or a CD player or the memory function of the seat adjustment. A PC program can be used to modify the parameters 10 via convenient menus.

Furthermore, a personal transponder card that enables access to the vehicle can be used to preselect corresponding driver-related strategies.

The invention claimed is:

1. A method of modifying a predefined adaptive driving strategy stored in a transmission electronics system of an automatic transmission for a motor vehicle as a function of a plurality of vehicle parameters defining a first driving style of a first human driver, the method comprising the steps of:
    modifying a first plurality of stored vehicle parameters representing at least a first driving style by at least one of:
        manually modifying at least certain of the first plurality of stored vehicle parameters to form a second plurality of stored vehicle parameters representing a second driving style by manual input of vehicle parameter data under direct control of a human driver; and
        automatically modifying at least certain of the first plurality of stored vehicle parameters to form a second plurality of stored vehicle parameters representing a second driving style by:
            determining vehicle parameter data of the second human driver while the second human driver is driving the vehicle; and
            inputting the vehicle parameter data of the second human driver to modify the vehicle parameters representing the first driving style to form the vehicle parameters of the second driving style; and
            storing the modified vehicle parameters representing the first driving style as the vehicle parameters representing the second driving style.

2. The method according to claim 1, further comprising the step of using a modifiable evaluation parameter as a parameter for evaluation of a longitudinal acceleration.

3. The method according to claim 1, further comprising the step of using a modifiable evaluation parameter as a parameter for the evaluation of a transverse acceleration.

4. The method according to claim 1, further comprising the step of using a modifiable evaluation parameter as a parameter for the evaluation of starting of the motor vehicle.

5. The method according to claim 1, further comprising the step of using a modifiable evaluation parameter as a parameter for evaluation of a kick-down shift of the automatic transmission.

6. The method according to claim 1, further comprising the step of using a modifiable evaluation parameter as a filtering parameter for an upper driving activity specification limit and for a lower driving activity specification limit.

7. The method according to claim 1, further comprising the step of using a modifiable evaluation parameter as a filtering parameter for at least one contribution of the individual evaluations of the parameters that characterize a particular human driver type and a human driver's driving style and the vehicle and a way the vehicle drives.

8. The method according to claim 1, further comprising the step of using a modifiable evaluation parameter as a parameter for curve recognition.

9. The method according to claim 1, further comprising the step of using a modifiable evaluation parameter as a parameter which blocks an upshift of the automatic transmission when an accelerator pedal of the motor vehicle is released spontaneously.

10. The method according to claim 1, further comprising the step of using a modifiable evaluation parameter as a parameter which triggers a forced downshift when the vehicle decelerates spontaneously.

11. The method according to claim 1, further comprising the step of using a modifiable evaluation parameter as a parameter which increases the driving activity when an accelerator pedal is depressed rapidly.

12. The method according to claim 11, further comprising the step of increasing a driving activity by increasing an evaluation counter.

13. The method according to claim 1, further comprising the step of modifying the evaluation parameters by applying a delay time to the evaluation parameters.

14. The method according to claim 1, further comprising the step of modifying the evaluation parameters by applying an offset to the evaluation parameters.

15. The method according to claim 1, further comprising the step of modifying the evaluation parameters by a factor.

16. The method according to claim 1, further comprising the step of using an on-board radio receiver as the data input unit.

17. The method according to claim 16, further comprising the step of inputting the data into the radio receiver via keys of the radio receiver.

18. The method according to claim 16, further comprising the step of inputting the data into the radio receiver via a CD player.

19. The method according to claim 16, further comprising the step of inputting the data into the radio receiver via a cassette player.

20. The method according to claim 1, further comprising the step of using an on-board navigation system as the data input unit.

21. The method according to claim 20, further comprising the step of inputting the data into a portable computer which communicates with the navigation system.

22. The method according to claim 1, further comprising the steps of using a diagnosis key of the motor vehicle as the data input unit for modifying parameters used in evaluation of a driving type to adapt a driving style of a first human driver to a driving style of a second human driver before the second human driver begins to drive;

manually inputting required data for the modifying of the parameters into transmission electronics by the data input unit and an interface with the transmission electronics; and automatically modifying the parameters to modify a dynamic behavior, depending on one of an actual driving activity of the human driver or contributions of individual evaluation functions.

23. The method according to claim 1, further comprising the step of using at least one memory key for a seat adjustment of the motor vehicle as the data input unit.

24. The method according to claim 1, further comprising the step of using a personal transponder card carried by the human driver as the data input unit.

* * * * *